(12) United States Patent
Lin

(10) Patent No.: US 8,794,373 B1
(45) Date of Patent: Aug. 5, 2014

(54) THREE-DIMENSIONAL AIR-ADSORBING STRUCTURE

(71) Applicant: Bose Corporation, Framingham, MA (US)

(72) Inventor: Lifun Lin, Lincoln, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 13/854,065

(22) Filed: Mar. 30, 2013

Related U.S. Application Data

(60) Provisional application No. 61/799,292, filed on Mar. 15, 2013.

(51) Int. Cl.
H04R 1/22 (2006.01)
H04R 1/20 (2006.01)

(52) U.S. Cl.
USPC .......................... 181/151; 381/354; 381/345

(58) Field of Classification Search
USPC .......... 181/151, 146, 149; 381/354, 165, 337, 381/345
See application file for complete search history.

(56) References Cited

U.S. PATENT DOCUMENTS

| | | | |
|---|---|---|---|
| 4,239,516 | A | 12/1980 | Klein |
| 4,356,882 | A * | 11/1982 | Allen ........................... 181/151 |
| 4,657,108 | A | 4/1987 | Ward |
| 4,978,650 | A | 12/1990 | Coughlin et al. |
| 5,529,609 | A | 6/1996 | Gooch et al. |
| 6,090,477 | A | 7/2000 | Burchell et al. |
| 6,585,111 | B1 | 7/2003 | Shervington et al. |
| 6,617,014 | B1 | 9/2003 | Thomson |

(Continued)

FOREIGN PATENT DOCUMENTS

| | | |
|---|---|---|
| EP | 2003924 A1 | 12/2008 |
| EP | 2293592 A1 | 9/2011 |

(Continued)

OTHER PUBLICATIONS

Wright, J.R., "The Virtual Loudspeaker Cabinet," Audio Engineering Society Convention Paper 5421, 111th Convention, Sep. 21-24, 2001, New York, USA.

(Continued)

*Primary Examiner* — Edgardo San Martin
(74) *Attorney, Agent, or Firm* — Brian M. Dingman; Dingman, McInnes & McLane, LLP

(57) ABSTRACT

A three-dimensional air-adsorbing structure for use in a volume in which there is a time-varying acoustic field. The structure has a three-dimensional, unitary, skeletal, porous scaffold having scaffold openings distributed within its volume, where the scaffold openings make up at least about 50% of the volume of the scaffold, air-adsorbing material particles, and a hydrophobic binder that couples air-adsorbing material particles to each other to form agglomerates and couples particles and agglomerates to the scaffold. The structure has structure openings in the agglomerates and structure openings between agglomerates, such structure openings being open to the outside environment, wherein the cumulative volume of the structure openings that have an apparent diameter larger than about 0.01 microns as measured by mercury porosimetry is at least about 40% of the volume of the air-adsorbing structure, and the cumulative volume of the structure openings that have an apparent diameter larger than about 5 microns as measured by mercury porosimetry is at least about 15% of the volume of the air-adsorbing structure.

22 Claims, 9 Drawing Sheets

(56) References Cited

U.S. PATENT DOCUMENTS

| | | | |
|---|---|---|---|
| 6,641,648 B2 | 11/2003 | Walker et al. | |
| 6,855,255 B2 | 2/2005 | Horng et al. | |
| 6,991,848 B2 | 1/2006 | Thomson | |
| 7,022,158 B2 | 4/2006 | Seguin et al. | |
| 7,448,467 B2 | 11/2008 | Wright et al. | |
| 7,463,747 B2 | 12/2008 | Kuze et al. | |
| 7,477,755 B2 | 1/2009 | Saiki et al. | |
| 7,743,877 B2 | 6/2010 | Saiki et al. | |
| 7,743,880 B2 | 6/2010 | Matsumura et al. | |
| 7,840,022 B2 * | 11/2010 | Matsumura et al. | 381/345 |
| 7,953,240 B2 | 5/2011 | Matsumura et al. | |
| 7,974,423 B2 | 7/2011 | Matsumura et al. | |
| 7,991,181 B2 | 8/2011 | Saiki et al. | |
| 8,184,826 B2 * | 5/2012 | Matsumura et al. | 381/89 |
| 8,265,330 B2 * | 9/2012 | Fukunishi et al. | 381/386 |
| 8,292,023 B2 * | 10/2012 | Slotte | 181/151 |
| 8,335,333 B2 * | 12/2012 | Saiki et al. | 381/345 |
| 8,565,463 B2 * | 10/2013 | Saiki et al. | 381/345 |
| 8,630,435 B2 * | 1/2014 | Mellow et al. | 381/345 |
| 2004/0028809 A1 | 2/2004 | Bein et al. | |
| 2005/0019099 A1 | 1/2005 | Ryerson et al. | |
| 2006/0153410 A1 | 7/2006 | Dodd | |
| 2007/0165895 A1 * | 7/2007 | Matsumura et al. | 381/351 |
| 2007/0195982 A1 * | 8/2007 | Saiki et al. | 381/345 |
| 2008/0170737 A1 * | 7/2008 | Saiki et al. | 381/346 |
| 2009/0028370 A1 | 1/2009 | Matsumura et al. | |
| 2009/0245562 A1 | 10/2009 | Saiki et al. | |
| 2010/0034411 A1 | 2/2010 | Mellow et al. | |
| 2010/0074463 A1 | 3/2010 | Fukunishi et al. | |
| 2010/0135516 A1 | 6/2010 | Saiki et al. | |
| 2010/0150389 A1 | 6/2010 | Sumiyama et al. | |
| 2010/0206658 A1 | 8/2010 | Slotte | |
| 2010/0329494 A1 | 12/2010 | Rouvala et al. | |
| 2010/0329498 A1 * | 12/2010 | Rouvala et al. | 381/354 |
| 2011/0048844 A1 | 3/2011 | Papakyriacou | |
| 2011/0183835 A1 | 7/2011 | Sauer et al. | |
| 2011/0200674 A1 | 8/2011 | MacKay | |
| 2012/0027243 A1 * | 2/2012 | Imamura et al. | 381/389 |
| 2012/0063627 A1 * | 3/2012 | Takashima et al. | 381/346 |
| 2013/0170687 A1 * | 7/2013 | Papakyriacou et al. | 381/338 |
| 2013/0170690 A1 * | 7/2013 | Backman | 381/354 |
| 2013/0308812 A1 * | 11/2013 | Shen | 381/346 |
| 2014/0037119 A1 * | 2/2014 | Yuasa | 381/346 |
| 2014/0064540 A1 * | 3/2014 | Lin | 381/346 |

FOREIGN PATENT DOCUMENTS

| | | |
|---|---|---|
| EP | 2424270 A1 | 2/2012 |
| GB | 2137608 A | 10/1984 |
| GB | 2391224 A | 2/2004 |
| GB | 2403093 B | 6/2005 |
| JP | 63317538 | 0/1988 |
| JP | 55-023039 A | 2/1980 |
| JP | 01226296 A | 9/1989 |
| JP | 2001261319 A | 9/2001 |
| JP | 2003304588 A | 10/2003 |
| JP | 2009267580 A | 11/2009 |
| JP | 2009267581 A | 11/2009 |
| JP | 2010045707 A | 2/2010 |
| KR | 100536259 | 0/2006 |
| WO | WO 2010095449 A1 | 8/2010 |
| WO | WO 2010134312 A1 | 11/2010 |

OTHER PUBLICATIONS

Miao, X., et al., Porous Calcium Phosphate Ceramics Prepared by Coating Polyurethane Foams with Calcium Phosphate Cements, Science Direct Materials Letters 58 (2004), pp. 397.

* cited by examiner

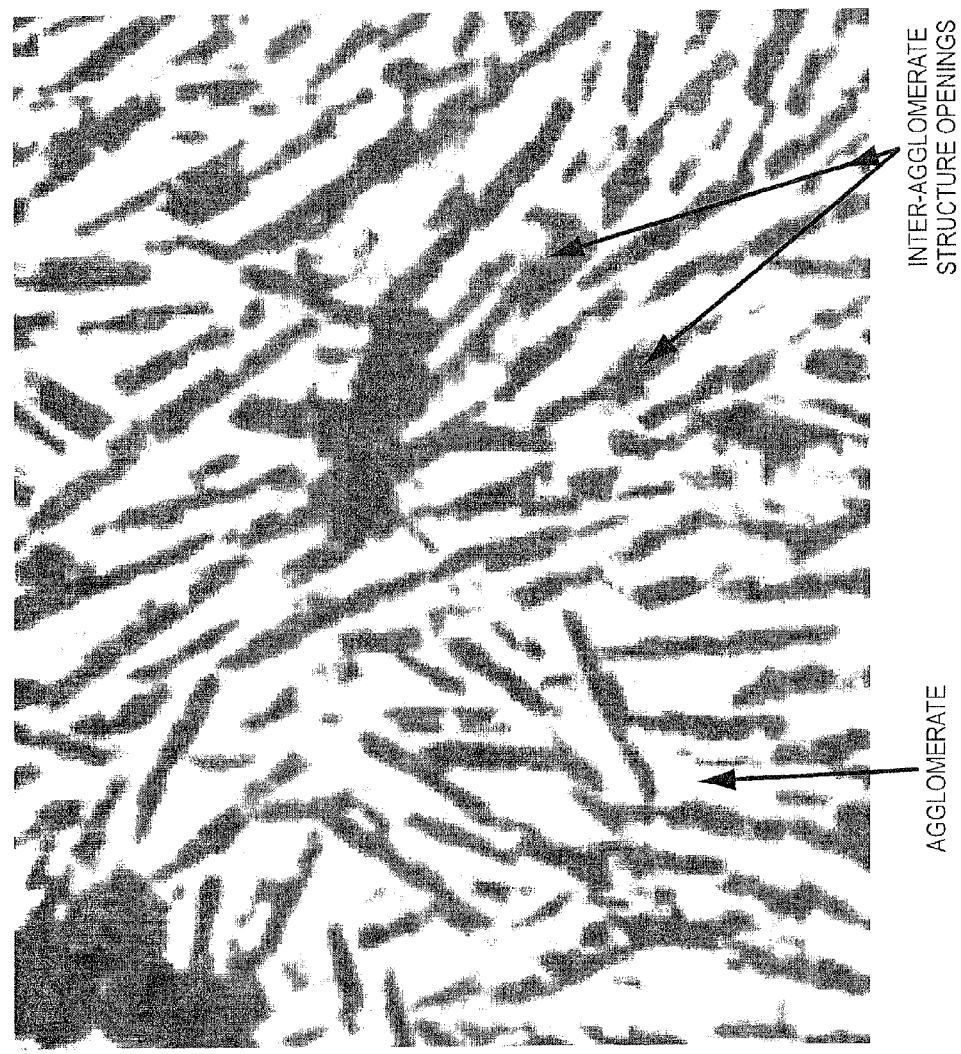

THREE-DIMENSIONAL AIR-ADSORBING STRUCTURE

CROSS-REFERENCE TO RELATED APPLICATION

This application claims benefit from U.S. Provisional Patent Application Ser. No. 61/799,292, filed on Mar. 15, 2013, the contents of which are incorporated herein by reference.

FIELD

This disclosure relates to a three-dimensional air-adsorbing structure for use in a volume in which there is a time-varying acoustic field, such as in a loudspeaker.

BACKGROUND

One goal of loudspeaker systems is to achieve a low resonant frequency in a speaker enclosure that has a relatively small internal volume. The resonant frequency of a speaker enclosure can be decreased by adding an air adsorber to the enclosure; the adsorber acts to increase air compliance of the enclosure.

A good adsorption material should have at least the following characteristics. The amount of gas adsorbed and desorbed should be strongly dependent on the pressure change. Also, the adsorption properties of the material should not degrade or change significantly when exposed to different environmental conditions. Further, since the amount of space inside the speaker cabinet that can be devoted to air-adsorbing materials is limited, the material needs to be packaged such that it occupies a small volume. On the other hand, the amount of air adsorption is directly related to the amount of air-adsorbing material in the speaker enclosure. Also, the material must be packaged in a manner that allows air to reach it in acoustic applications, which generally need to be above 40 Hz.

Moisture in the atmosphere can be detrimental to the proper function of adsorption materials. Often when an adsorption material is exposed to a humid environment many adsorption sites are preferentially occupied by water molecules, leaving few sites for the adsorption/desorption of air molecules. This phenomenon renders the adsorption material ineffective in regulating the pressure of an acoustic enclosure through adsorption/desorption of air inside the enclosure.

SUMMARY

This disclosure relates to the use of an air adsorbent in the form of a three-dimensional structure. The structure can be located within a loudspeaker enclosure, a waveguide or another volume with a time-varying acoustic field. The structure carries effective air-adsorbing material with an adsorbency that is minimally degraded by the presence of humidity, so that the air-adsorption capacity of the air-adsorption structure is minimally degraded by humidity. The material is dispersed on the structure in a manner such that the inter-material openings are large enough to allow air to reach the material that is exposed to the openings at frequencies of 40 to 100 Hz, or greater. A loudspeaker system that includes the adsorbent structure thus exhibits long-term increased air compliance without the need to use a cumbersome humidity control system in the speaker enclosure.

In one aspect a three-dimensional air-adsorbing structure for use in a volume in which there is a time-varying acoustic field includes a three-dimensional, unitary, skeletal, porous scaffold having scaffold openings distributed within its volume, where the scaffold openings make up at least about 50% of the volume of the scaffold, air-adsorbing material particles, and a hydrophobic binder that couples air-adsorbing material particles to each other to form agglomerates and couples particles and agglomerates to the scaffold. The structure has structure openings in the agglomerates and structure openings between agglomerates, such structure openings being open to the outside environment. The cumulative volume of the structure openings that have an apparent diameter larger than about 0.01 microns as measured by mercury porosimetry is at least 40% of the volume of the air-adsorbing structure, and the cumulative volume of the structure openings that have an apparent diameter larger than about 5 microns as measured by mercury porosimetry is at least 15% of the volume of the air-adsorbing structure.

Embodiments may include one of the following features, or any combination thereof. The cumulative volume of the structure openings that have an apparent diameter larger than about 5 microns as measured by mercury porosimetry may be greater than 0.2 ml/g of the air-adsorbing structure. The cumulative volume of the structure openings that have an apparent diameter larger than about 0.01 microns as measured by mercury porosimetry may be greater than 0.6 ml/g of the air-adsorbing structure. The structure may further include closed volumes that are not open to the outside environment, where wherein the volume of the structure openings is greater than the volume of the closed volumes. The volume of the structure openings may be at least nine times the volume of the closed volumes.

Embodiments may include one of the following features, or any combination thereof. The scaffold can be made from an open-cell foam or an electrospun fibrous material. The open-cell foam may have at least about 10 cells per inch, or it may have more than about 50 cells per inch and less than about 500 cells per inch. The scaffold openings may make up at least about 90% of the volume of the scaffold. The scaffold can comprise melamine foam or polyurethane foam. The air-adsorbing material and the agglomerates may be coupled to the scaffold by creating a water-based emulsion of air-adsorbing material, agglomerates of the material and binder and then impregnating the scaffold with this emulsion. The emulsion may be dried at least in part at a temperature below the freezing point of the emulsion. The binder may be an acrylic material or a polyurethane material or a polyacrylate material.

Embodiments may include one of the following features, or any combination thereof. The openings in the structure may also include one or more channels in the structure that are open to the environment and have diameters of greater than 250 microns. The binder may be sufficiently hydrophobic that the surface tension of a film cast with the binder, measured with deionized water as the test solution, is less than about 55 dynes/cm or even less than about 45 dynes/cm. The air-adsorbing material may comprise a silicon-based zeolite material or a powdered activated carbon. The structure may further comprise closed volumes that are not open to the outside environment, where the surface area of the structure openings plus the surface area of closed volumes, as measured by CT scanning with a resolution of at least 5 microns, is at least about 3 mm$^2$/mm$^3$ of air-adsorbing structure. The acidity of the air-adsorbing structure, as determined by mixing one part of the structure with five parts of water and measuring the resulting pH, is preferably such that the pH is greater than 4.

In another aspect, a three-dimensional air-adsorbing structure for use in a volume in which there is a time-varying acoustic field includes a three-dimensional, unitary, skeletal, porous scaffold having scaffold openings distributed within its volume, where the scaffold openings make up at least about 90% of the volume of the scaffold, air-adsorbing material particles, and a hydrophobic binder that couples air-adsorbing material particles to each other to form agglomerates and couples particles and agglomerates to the scaffold. The structure has structure openings in the agglomerates and structure openings between agglomerates, such structure openings being open to the outside environment, wherein the cumulative volume of the structure openings that have an apparent diameter larger than about 0.01 microns as measured by mercury porosimetry is at least 40% of the volume of the air-adsorbing structure and wherein the cumulative volume of the structure openings that have an apparent diameter larger than about 5 microns as measured by mercury porosimetry is at least about 15% of the volume of the air-adsorbing structure. The structure further includes closed volumes that are not open to the outside environment, where the volume of the structure openings is at least nine times the volume of the closed volumes.

Embodiments may include one of the following features, or any combination thereof. The scaffold may comprise melamine foam or polyurethane foam. The binder may be selected from the group of binders consisting of an acrylic material, a polyurethane material and a polyacrylate material, and wherein the binder is sufficiently hydrophobic that the surface tension of a film cast with the binder, measured with deionized water as the test solution, is less than about 55 dynes/cm. The air-adsorbing material and the agglomerates may be coupled to the scaffold by creating an emulsion of air-adsorbing material, agglomerates of the material and binder and then impregnating the scaffold with this emulsion, wherein the emulsion is dried at least in part at a temperature below the freezing point of the emulsion.

Other features will occur to those skilled in the art and are within the scope of the subject innovation.

BRIEF DESCRIPTION OF THE DRAWINGS

FIG. 3B is a higher-resolution a CT scan of a section of a three-dimensional air-adsorbing structure showing agglomerates of air-adsorbing material particles and inter-agglomerate structure openings.

DETAILED DESCRIPTION

Figure 1:
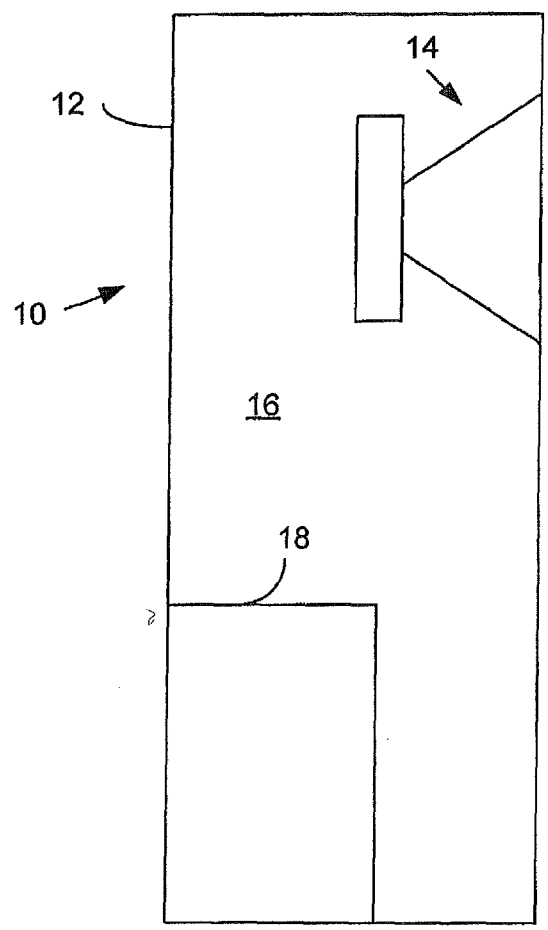
FIG. 1 is a schematic diagram of a loudspeaker system that is a non-limiting example of the present disclosure.

Loudspeaker system 10, FIG. 1, includes enclosure 12. Electro-acoustic transducer 14 is mounted in enclosure 12 so as to project sound from the enclosure while leaving space 16 inside of enclosure 12 that is unoccupied by transducer 14. Three-dimensional air-adsorbing structure 18 is located in space or volume 16 inside of enclosure 12 that is unoccupied by transducer 14. Enclosure 12 can be closed, or it can be partially open, e.g., as would be accomplished with one or more ports (not shown). The structure can also be used in other volumes that are exposed to a time-varying acoustic field.

Three-dimensional air-adsorbing structure 18 comprises a three-dimensional, light-weight, unitary, skeletal, low-solid volume, porous scaffold having scaffold openings that are open to the environment. In one non-limiting example the scaffold openings make up at least about 50% of the volume of the scaffold. The structure also includes air-adsorbing material particles, and a hydrophobic binder that couples air-adsorbing material particles to each other to form agglomerates and couples particles and agglomerates to the scaffold.

The structure has structure openings in the agglomerates and structure openings between agglomerates. Structure openings are open to the environment so that the air-adsorbing material that is exposed to a structure opening is able to adsorb and desorb air as the structure is exposed to a time-varying acoustic field. The structure may also have closed volumes which are pockets or chambers that are not open to the environment and so do not contribute to the air-adsorption capacity of the structure. In non-limiting examples the cumulative volume of the structure openings that have an apparent diameter larger than about 0.01 microns as measured by mercury porosimetry is greater than 0.6 ml/g of the air-adsorbing structure, and the cumulative volume of the structure openings that have an apparent diameter larger than about 5 microns as measured by mercury porosimetry is greater than 0.2 ml/g of the air-adsorbing structure. Also, in non-limiting examples the cumulative volume of the structure openings that have an apparent diameter larger than about 5 microns as measured by mercury porosimetry is at least about 15% of the volume of the air-adsorbing structure. In other non-limiting examples the cumulative volume of the structure openings that have an apparent diameter larger than about 0.01 microns as measured by mercury porosimetry is at least 40% of the volume of the air-adsorbing structure. The air-adsorbing material is typically one or both of zeolite material (typically, a silicon-based zeolite) and powdered or granular activated carbon.

Figure 2:
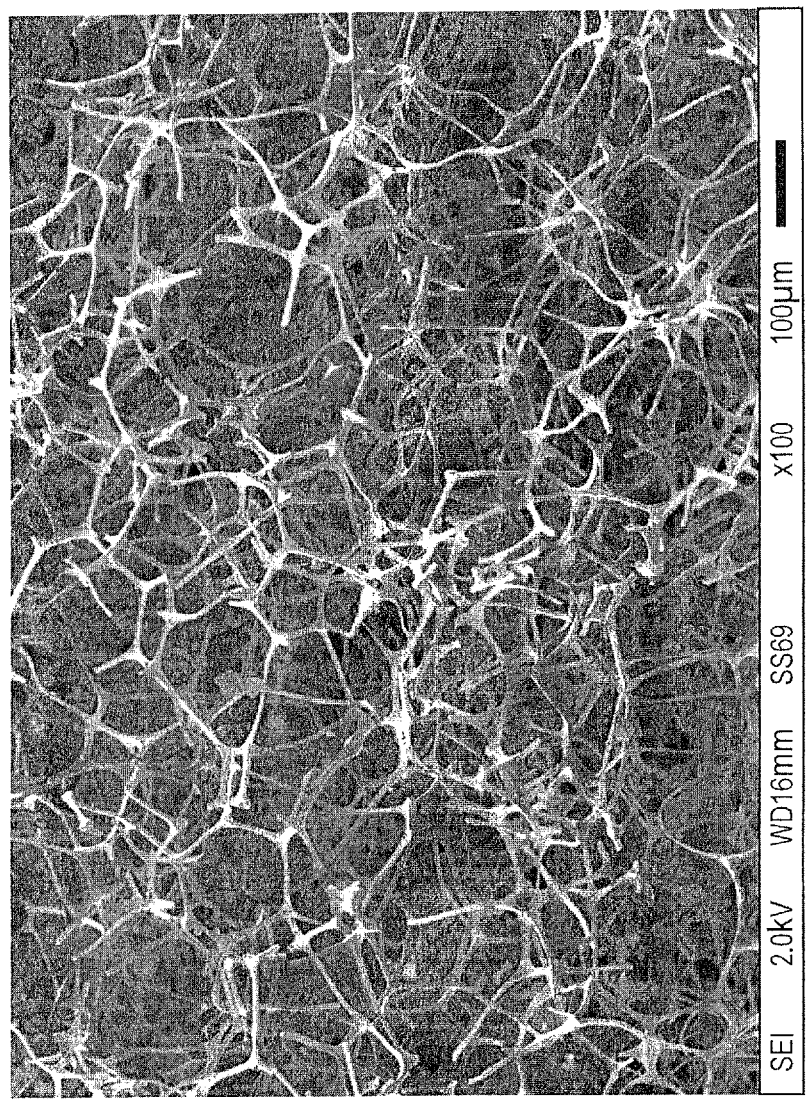
FIG. 2 is a scanning electron micrograph of a scaffold for the air-adsorbing structure.

In non-limiting examples the scaffold can be an open cell foam or a fibrous material, for example an electrospun fibrous material. Foams typically have from about 10 cells per inch to about 500 cells per inch, and more preferably from about 50 cells per inch up to about 500 cells per inch. The scaffold openings may make up at least about 90% of the volume of the scaffold. The scaffold preferably has a density of less than about 0.1 g/cc. The scaffold is a very open, skeletal, unitary structure. One example of the scaffold is shown in FIG. 2. This scaffold is an open-cell melamine foam consisting of a formaldehyde-melamine-sodium bisulfate copolymer, available as "Basotect" material from BASF, Germany. The scaffold can be made of other materials, including but not limited to electrospun fibrous materials, ceramic foams and metal foams.

The air-adsorbing material and the agglomerates of the material are coupled to the scaffold by a binder. The binder should be hydrophobic so as to inhibit moisture retention that would block the openings and thus decrease the air-adsorption capacity of the structure, which is further described below. For example, the binder may be one or more of an acrylic material, a polyacrylate or a polyurethane material. The structure can be created by creating an emulsion of air-adsorbing material, agglomerates of air-adsorbing material, and binder, and then impregnating the scaffold with this emulsion. The binder is typically present at about 3-6 weight percent of the weight of the air-absorption structure. The emulsion-impregnated scaffold may be dried at least in part at a temperature below the freezing point of the emulsion; this helps to maintain the structure of the openings when the liquid phase is removed and thus prevents too much compacting of solid material. Alternatively or additionally, the scaffold can be dried at room temperature or in an oven.

The binder will act to bind some of the adsorption material powder into agglomerates, and to bind the adsorption material powder and the agglomerates to the scaffold. The air-adsorbing structure needs to be able to operate in humid environments. The binder should not absorb water vapor that would potentially block the openings in the structure and thus prevent air from reaching the material via the openings. Therefore, the binders should have certain minimum hydrophobicity.

One way of determining the hydrophobicity of potential binder materials is to measure the contact angle/surface tension of films made of the binder material. The binder is dissolved or diluted with solvent or water to form a liquid. A film is made by casting the dilute binder liquid on a glass surface, then the liquid is removed through evaporation followed by heating to a temperature of at least 100° C. for 1 hr. The contact angle/surface tension of the dry film is measured using a PG-X measuring head available from pocketgoniometer.com. The measurements are made at room temperature in a lab atmosphere. This video based instrument dispenses a 4.5µ liter volume DI water drop on the film surface. Individual measurements are made using a two second dwell after the drop is imparted to the surface. A built-in camera captures single droplet images to determine the static contact angle of the water droplet. A geometric construction is made using an actual image of the droplet and the resident software to determine the contact angle. The contact angle is converted to surface tension according ASTM D5946-01. Ten readings are taken (ten individual drops). The reported value is the mean of the ten readings.

The air compliance increases associated with the air-adsorbing structure can be gauged by measuring the increase in the apparent volume of a sealed loudspeaker enclosure with and without the air-adsorbing structure (or in some cases below, with and without the air-adsorbing material per se, (that is the material not bound to a scaffold)). Air compliance data reported here was obtained by simultaneously measuring the transducer cone displacement and the pressure inside a sealed acoustic box, when signals are applied to transducer. Air compliance is calculated as cone displacement*cone area/pressure. The "apparent volume ratio" equals the air compliance with adsorbent divided by the air compliance without adsorbent. Table 1 illustrates the performance degradation (as determined by the ratio of apparent volume ratios) at 200 Hz of the 3D porous structure made with different binders before and after at least one day of exposure to high humidity (40° C., 90% relative humidity (RH) conditions). The ratio reported states the degradation in apparent volume ratio due to water absorption in the humid environment.

TABLE 1

| Binder | Static Contact Angle | Surface Tension (dynes/cm) | Apparent Volume Ratio after 40° C., 90% RH/Apparent Volume Ratio before 40 C., 90% RH, at 200 Hz. |
|---|---|---|---|
| acrylic | 107.76 | <29 | 99% |
| acrylic | 76.25 | 38 | 97% |
| polyacrylate | 60.05 | 43 | 73% |

So as to accomplish a hydrophobicity that accomplishes in the structure an acceptable level of air-adsorption degradation due to humidity, the surface tension of a film cast from binder, with DI water as test solution, should be smaller than about 57 dynes/cm; this quantity was extrapolated from the tests run as reported in Table 1. The preferred surface tension of film cast from binder is less than about 55 dynes/cm, most preferably about 45 dynes/cm or less. The binder is not an active air-adsorbing material, so it is preferred that the binder be present at less than 20 wt %, and more preferably less than 10 wt %, of the weight of the adsorption material that is part of the 3D structure.

Figure 3A:
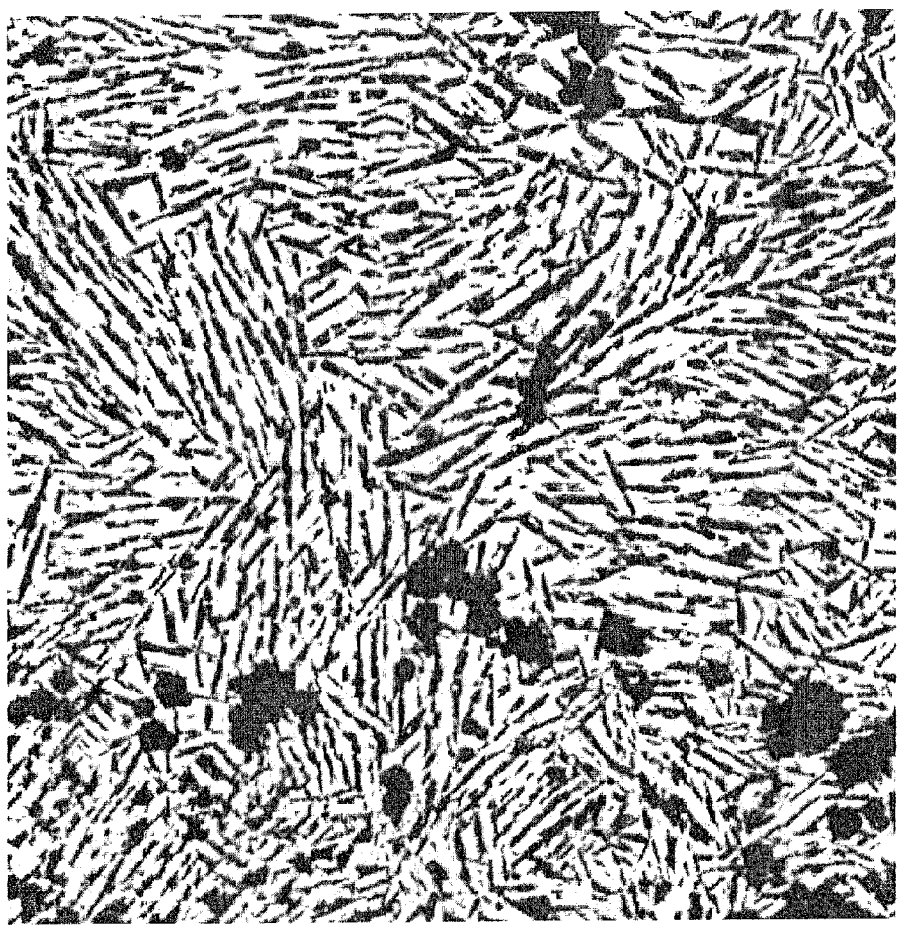
FIG. 3A is a CT scan of a section of a three-dimensional air-adsorbing structure showing agglomerates of air-adsorbing material particles and inter-agglomerate structure openings.

FIGS. 3A and 3B are CT scans of a portion of a three-dimensional air-adsorbing structure. This structure was composed of a zeolite air-adsorbing material, an acrylic binder, and melamine foam. It was made by mixing 12 g of zeolite, 0.5 g of binder and 15 g water to form a slurry. The slurry was then impregnated into the foam, then dried at a temperature less than 0° C. under low water vapor pressure until more than 60% of the liquid was removed, followed by heat treatment at 150° C. The light-colored areas are agglomerates of zeolite material that are coupled to a scaffold. The dark areas are inter-agglomerate openings. The elongated nature of the agglomerates and the inter-agglomerate openings is postulated to be due to freeze-drying. The surface area of structure openings plus the surface area of closed volumes in the air-adsorbing structure, as measured by CT scanning with a resolution of at least 5 microns, is preferably at least about 3 $mm^2/mm^3$ of air-adsorbing structure.

Figure 4:
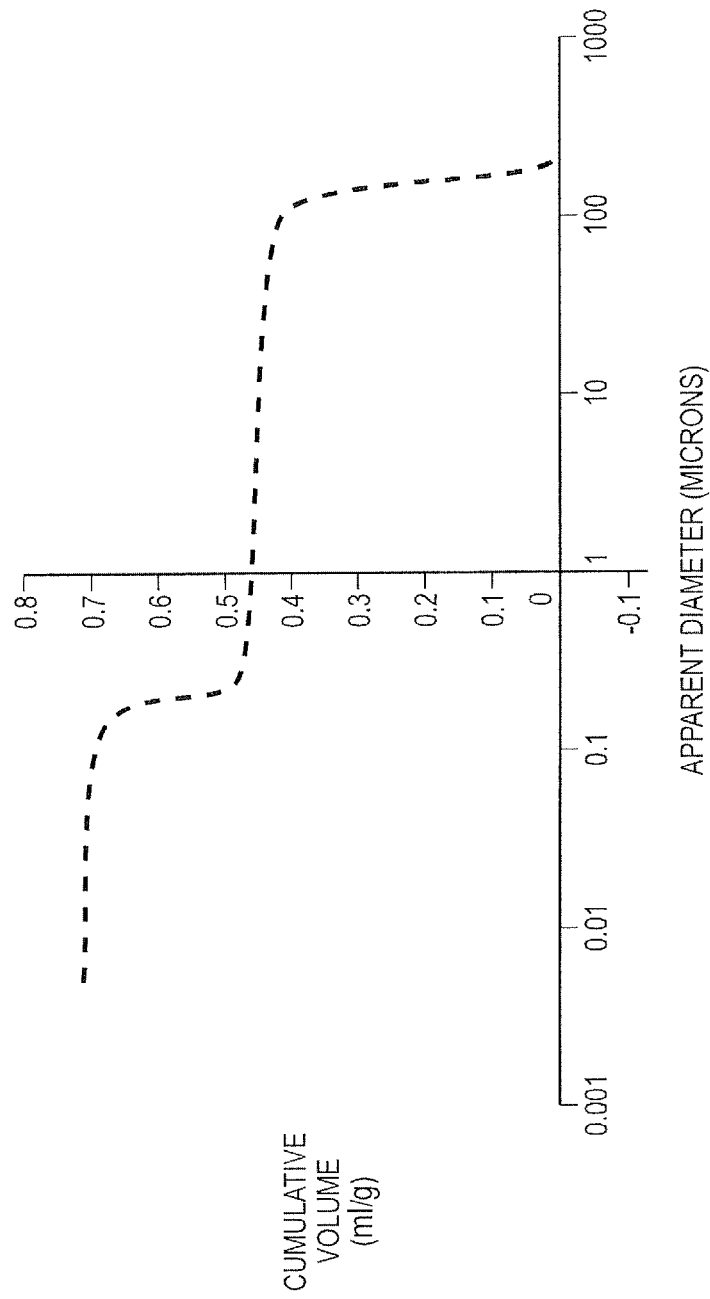
FIG. 4 is a plot of mercury porosimetry data taken for one example of the three-dimensional air-adsorbing structure.

The following measurements were carried out using mercury intrusion porosimetry testing in accordance with ASTM D4404-10, with the sample being dried before testing at 150° C. for 4 hours. Mercury porosimetry testing will measure the cumulative volume of structure openings as a function of the apparent diameter of the structure openings. See FIG. 4 for mercury porosimetry data for one example of an air-adsorbing structure in accordance with the present innovation. In this case, the volume of structure openings in the air-adsorbing structure with an apparent diameter larger than about 5 microns is greater than 0.4 ml/g of the 3D air-adsorbing structure. More generally, the volume of structure openings in the air-adsorbing structure with an "apparent diameter" as defined in ASTM D4404-10 larger than about 0.01 microns as measured by mercury porosimetry is preferably greater than 0.6 ml/g of the 3D air-adsorbing structure. The volume of structure openings in the air-adsorbing structure with an apparent diameter larger than about 5 microns as measured by mercury porosimetry is preferably greater than 0.2 ml/g of the 3D air-adsorbing structure. The total cumulative volume of all structure openings of the air-adsorbing structure as measured by mercury porosimetry is preferably at least about 40% of the volume of the structure. The cumulative volume of structure openings with an apparent diameter larger than 5 microns as measured by mercury porosimetry is preferably greater than 15% of the volume of the structure.

Figure 5:
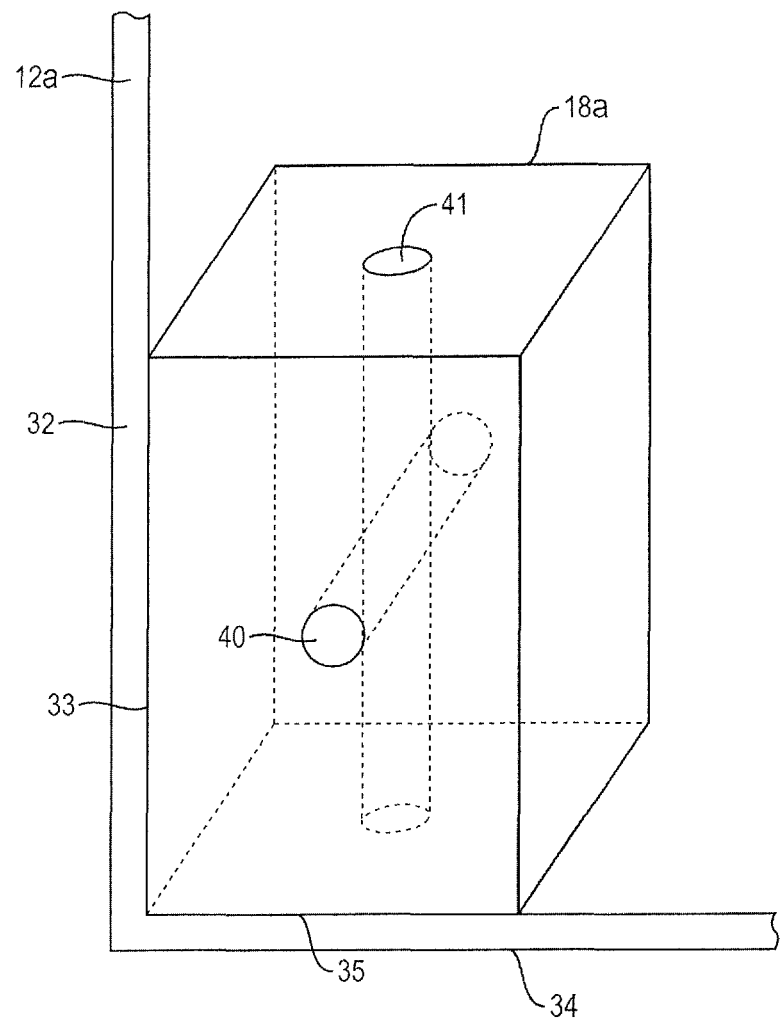
FIG. 5 illustrates a 3D air-adsorbing structure with channels that are open to the atmosphere and have diameters of greater than 250 microns. It also shows the structure coupled to a loudspeaker enclosure.

FIG. 5 shows 3D air-adsorbing structure 18a located in loudspeaker enclosure 12a that has intersecting walls 32 and 34. An adhesive 33, 35 can be used to hold the structure in place in the enclosure. Or, mechanical fasteners (not shown) that are coupled to the structure and the enclosure can be used since the scaffold can have sufficient structural integrity to hold a fastener. Structure 18a has a number of channels 40, 41, that are open to the atmosphere and have diameters of greater than the inter-agglomerate openings, and are typically larger than 250 microns in diameter. These channels can intersect or not, as necessary to allow at the frequency of interest air to penetrate the volume of the air-adsorbing structure so that it can reach the air-adsorbing material and be adsorbed and desorbed. The channels are thus a means of facilitating air ingress/egress into the bulk of the structure, to account for increased flow resistance as the depth of the structure increases. The channels are typically made in the scaffold before it is impregnated, or can be made in a secondary operation post impregnation. They can be made by laser boring or mechanical drilling, for example. This is one non-limiting manner to provide for a means of air ingress and egress at frequencies of 100 Hz or more through the thickness of a three-dimensional structure should such be needed.

Figure 6:
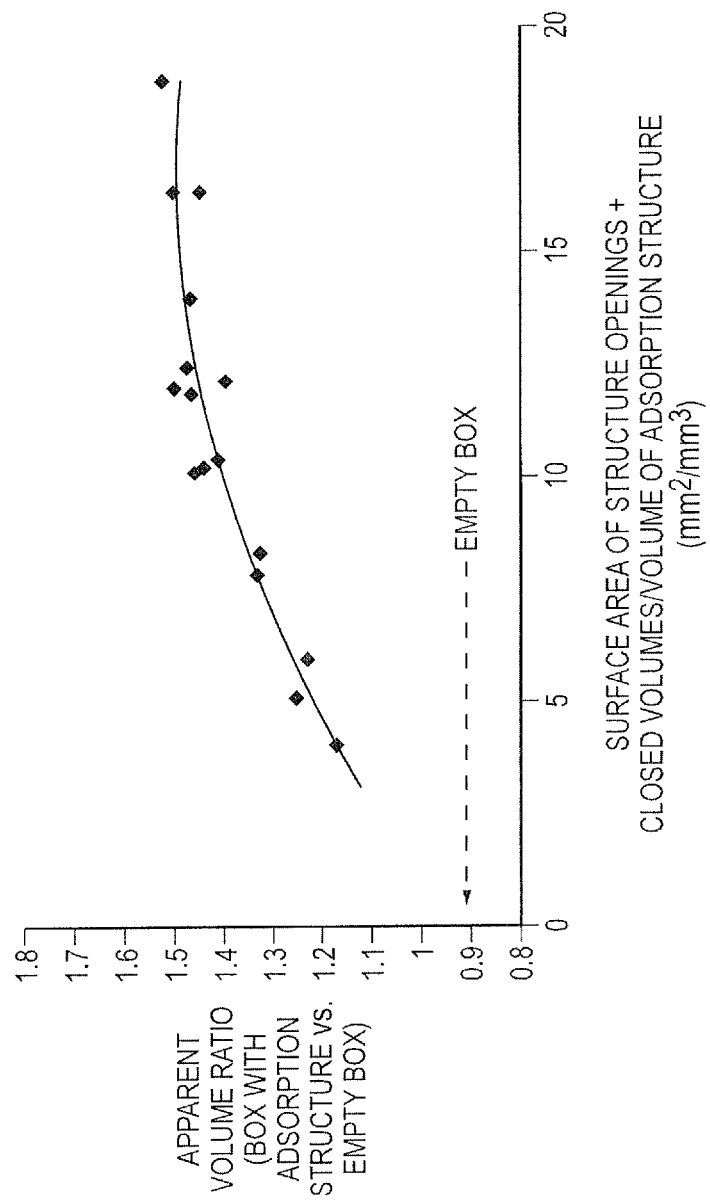
FIG. 6 is a graph illustrating the change in apparent volume ratio of a three-dimensional air-adsorbing structure as a function of the surface area of the sum of inter-agglomerate structure openings plus closed volumes, per unit volume of the three-dimensional air-adsorbing structure

FIG. 6 is a graph illustrating the change in apparent volume ratio of a three-dimensional air-adsorbing structure at 200 Hz as a function of the total surface area of the inter-agglomerate structure openings (i.e., structure openings with apparent diameters of at least 5 microns) plus the surface area of closed volumes, of a three-dimensional air-adsorbing structure. The surface area is calculated from a CT scan using commercial image processing software such as Avizo from Visualization Sciences Group or Volume Graphics from Volume Graphics GmbH. A surface area of at least about 3 mm$^2$ per mm$^3$ of the air-adsorbing structure is effective to maintain apparent volume ratio at 200 Hz above one. A value of one corresponds to an empty box (e.g., a loudspeaker enclosure) without any adsorption material. The air-adsorption structures tested had surface areas of structure openings up to about 20 mm$^2$ per mm$^3$ and apparent volume ratios of over 1.5, as illustrated in FIG. 6.

In one non-limiting example the air-adsorbing material particles are a silicon-based zeolite. The zeolite may include one or more second elements (typically metals or metalloids) such as B, Al, Ti, Ge, Fe, Ga, or a rare earth element in the framework. In one non-limiting example, the mole ratio of silicon to the second element(s) is at least about 200 and is less than 400. The air-adsorbing material can consist entirely of zeolite, or zeolite can make up only part of the material. Further, one or more types of zeolite can be included in the zeolite component of structure 18. The amount of air absorbing material used in the 3D structure can be varied, according to need. Generally, more adsorbent leads to greater compliance. However, the cost, weight and volume of the adsorbent are practical factors to be considered, as is of course the scaffold and the need to load it so that air can reach the structure openings at the frequency of interest. Materials that can be used in the structures disclosed herein are further described in application Ser. No. 13/600,941 filed on Aug. 31, 2012, the disclosure of which is incorporated herein by reference.

The air-adsorbing material is preferably a silicon-based zeolite which includes a relatively small amount of one or more additional metals or metalloids; in one case the second metal is aluminum. Zeolites can exist in myriad types of crystal structures, any or all of which may be appropriate for the air adsorbent herein. Non-limiting types of zeolites that have been shown to be appropriate air adsorbent materials for the subject loudspeaker system include FAU, MOR, FER, MFI and BEA types, where FAU, MOR, FER, MFI and BEA are framework code types assigned by the International Zeolite Association.

One way to minimize the sites of alumino-silicate zeolites to which water vapor will readily bind is to increase the SiO2/Al2O3 ratio. Since aluminum is a common impurity in the silica source material used in synthesis of zeolites, to achieve high SiO2/Al2O3 molar ratio expensive, difficult to source high-purity silica source material is required, and there needs to be strict control of zeolite synthesis so as to minimize Al contamination. The data presented herein helps to establish that for zeolites with a mole ratio of Si to Al of from at least about 200 up to less than 400, the material provides acoustic performance benefit without the need to use high-purity silica source material or to control synthesis conditions as strictly as is necessary to achieve Si:Al mole ratios of 400 or greater. The result is a material that can be readily used in commercial loudspeaker systems. When the subject zeolite has a mole ratio of silicon to the second element in the range of from at least about 200, up to less than 400, it is able to retain up to about 90% of its air absorbency even after extended exposure to high humidity, indicating that the nitrogen binding sites of the zeolite material are not substantially affected by water molecules.

Apparent volume ratio data for air-absorption material per se (not as part of a 3D structure) is set forth in the Table 2 below. For each adsorbent, the material was dried at 200° C. until weight loss due to loss of adsorbed water vapor was stabilized. Then the material was cooled to room temperature at 22° C. and about 30% relative humidity. The air compliance was then measured (at 100 Hz) and the apparent volume ratio was calculated. The adsorbent was then exposed to conditions of 40° C.×90% relative humidity (RH) until the weight gain due to water vapor uptake was stabilized, indicating an equilibrium condition. Again the air compliance was measured and the apparent volume ratio calculated. Table 2 presents the two measurements of apparent volume ratio and the decrease of the ratio due to water vapor uptake, calculated as: (dry ratio-ratio after water vapor equilibrium)/dry ratio.

TABLE 2

| Zeolite | Zeolite 1 | Zeolite 2 | Zeolite 3 | Zeolite 4 | Zeolite 5 | Zeolite 6 | Zeolite 7 | Zeolite 8 |
|---|---|---|---|---|---|---|---|---|
| Framework Type | Beta | Beta | MFI | MFI | MFI | MFI | MFI | MFI |
| Reported SiO2/Al2O3 molar ratio* | 150 | 300 | 80 | 90 | 240 | 280 | 400 | 1,200 |
| Measured SiO2/Al2O3 molar ratio | 212 | 236 | 91 | 90 | 281 | 284 | 389 | 955 |

TABLE 2-continued

| Zeolite | Zeolite 1 | Zeolite 2 | Zeolite 3 | Zeolite 4 | Zeolite 5 | Zeolite 6 | Zeolite 7 | Zeolite 8 |
|---|---|---|---|---|---|---|---|---|
| Apparent Volume Ratio at 22° C., 20-30% RH, at 100 Hz | 1.87 | 1.78 | 1.76 | 2.00 | 1.88 | 1.76 | 1.74 | 1.91 |
| Apparent Volume Ratio (after exposure to 40° C., 90% RH until weight gain stabilized), at 100 Hz | 1.18 | 1.08 | 1.40 | 1.57 | 1.72 | 1.68 | 1.68 | 1.82 |
| Reduction in Apparent Volume Ratio due to moisture saturation, % | −37% | −39% | −21% | −21% | −9% | −5% | −3% | −5% |

*data reported by material supplier

These data establish that the apparent volume ratio of zeolite material with a Si/Al mole ratio of from about 200 up to about 400 drops by only from about 3% to about 10% due to water vapor absorption under the stated conditions, as compared to a drop in the range of 20% for MFI zeolite with Si/Al ratio of less than 100 after they reached equilibrium under the stated conditions. Zeolite with a different structure but the same Si/Al ratio can have a different degree of compliance impact. For example, after a similar humidity test, zeolite with a beta structure lost much more air compliance (about 40%) than the MFI structure at a similar level of Si/Al. Thus, the benefit obtained in compliance increase of zeolite adsorbents when exposed to humidity is dependent on the zeolite structure as well as the mole ratio of Si to Al.

Figure 7:
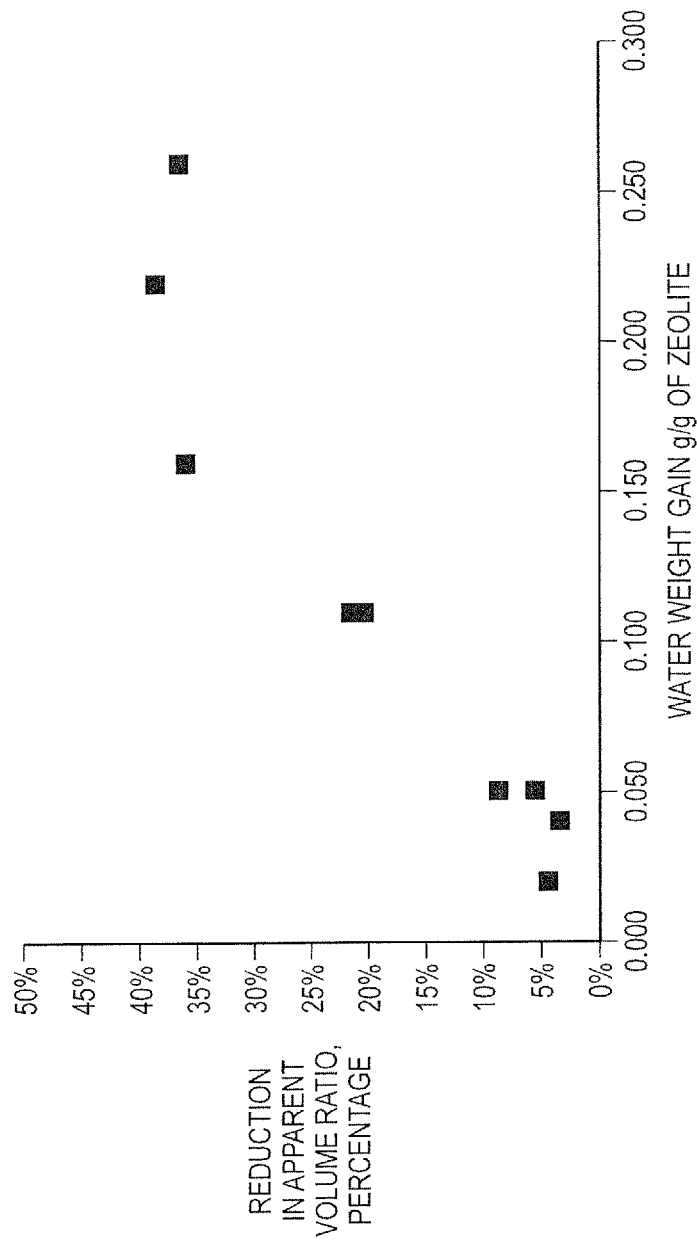
FIG. 7 is a plot of the reduction of apparent volume ratio as a function of steady state water vapor uptake for various zeolite air-adsorbing materials that can be used in the air-adsorbing structure.

FIG. 7 is a plot of the reduction in apparent volume ratio (from dry to equilibrated state after exposure to 40° C., 90% relative humidity conditions until the weight gain is essentially stabilized) as a function of steady state water vapor uptake for several zeolite adsorbents. These data establish that for materials that exhibit an equilibrium water weight gain under the stated conditions of less than about 10%, and preferably less than about 7%, the apparent volume ratio difference is very small—less than about 10%.

Since activated carbon is a common adsorbent, we compare the performance of zeolite to that of activated carbon. Table 3 compares the (apparent) volume ratio of an acoustic box containing an MFI silicate zeolite (zeolite 6 in Table 1) to that of BPL 6×16 mesh activated carbon from Calgon, in both the dry state and when equilibrated to 40° C., 90% RH. The loading of adsorbents in the loudspeaker box was about 35-40 volume %. The performance was compared at 10 Hz. The activated carbon is shown to be not as effective at increasing compliance in a humid environment, while the zeolite has only about a 5% decay in performance.

TABLE 3

| Material | Zeolite 6 | Activated Carbon (6 × 16 mesh) |
|---|---|---|
| Apparent Volume Ratio at 22° C., 20-30% RH, at 10 Hz | 1.76 | 1.80 |
| Apparent Volume Ratio (after exposure to 40° C., 90% RH until weight gain stabilized), at 10 Hz | 1.68 | 1.05 |
| Reduction in Apparent Volume Ratio due to moisture saturation, % | −5% | −42% |

When the second elements in the silicate zeolite are of different valance from silicon, the zeolite will not be neutrally charged and so will contain charged counter ions such as alkali metals, ammonium, hydrogen ions, metal ions, or mixtures thereof that act to balance the charge of the zeolite. The counter ion influences the acidity of zeolite. The acidity of zeolite was determined by mixing one part by weight of zeolite or 3D air-adsorbing structure to five parts of water and measuring the resulting pH. It is desirable to use a zeolite and a 3D air-adsorption structure with a pH greater than 4 as measured in this manner, so as to reduce any tendency of the zeolite or the 3D air-adsorption structure to corrode metal inside the speaker enclosure. For example, zeolite 6 (Tables 1 and 2) includes ammonium counter cations and its pH is 7. The counter cations in this same zeolite become hydrogen ions if the material is heat treated in air at 600° C., and in turn the pH of this zeolite decreases to 3.2. It has been determined that potential corrosion caused by such acidic zeolites is decreased when its pH, as measured per the above procedure, is above 4.

Figure 8:
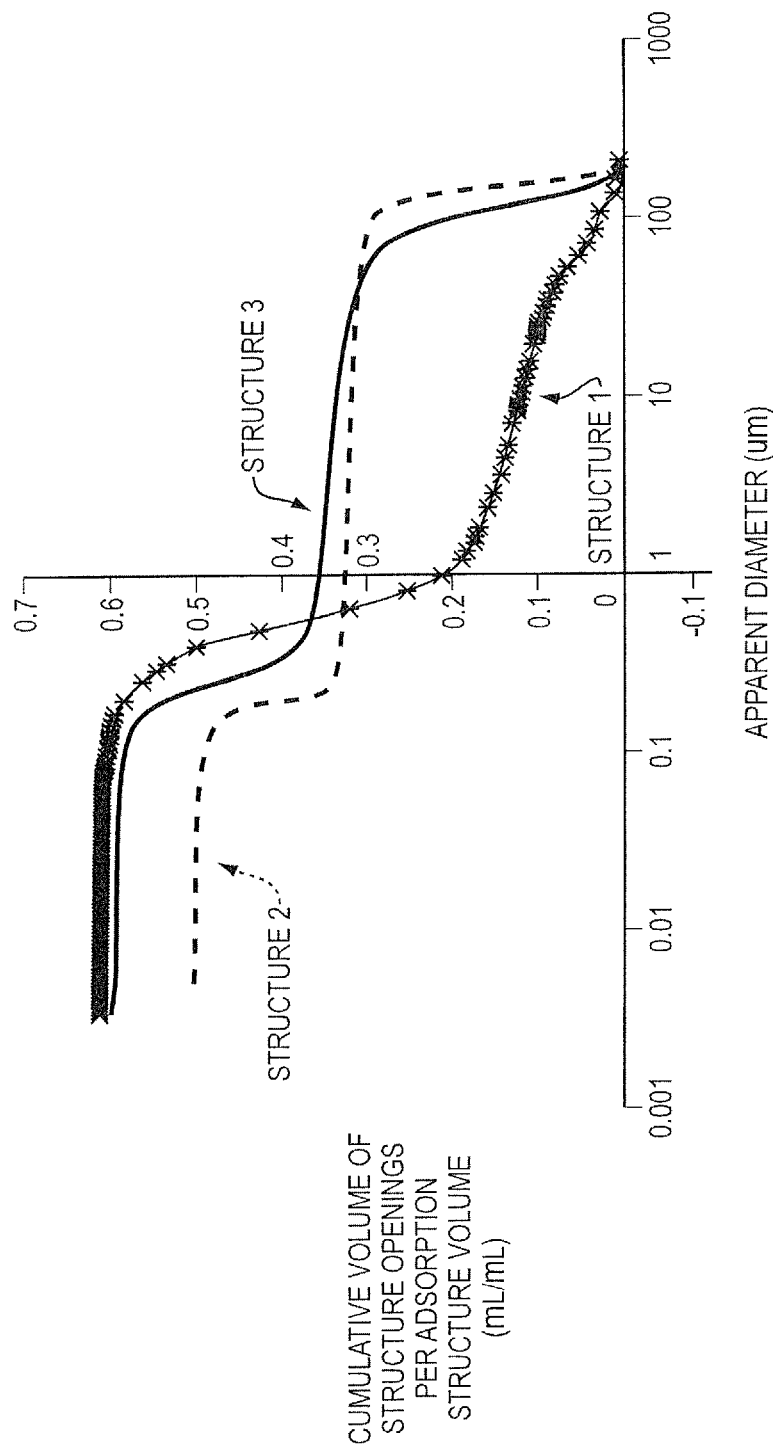
FIG. 8 is a plot of mercury porosimetry data (cumulative structure opening volume as a function of apparent diameter) for three structures.

FIG. 8 illustrates mercury porosimetry data for three different adsorbent structures. The apparent volume ratio at 100 Hz for the three structures (structures 1, 2 and 3, respectively) are 0.98, 1.16 and 1.5. Structure 1 is thus ineffective to increase compliance at 100 Hz. These data support that structures should have a cumulative volume of structure openings with apparent diameters greater than about 5 microns of more than about 15 volume % of the adsorption structure in order to accomplish an apparent volume ratio greater than 1 at 100 Hz.

The volume in structure 1 of structure openings with apparent diameters greater than about 5 microns is about 13.4% of the structure volume. The volume in structure 2 of structure openings with apparent diameters greater than about 5 microns is about the same as the volume in structure 3 of structure openings with apparent diameters greater than about 5 microns. Both are in the range of about 30-35%. Accordingly, it is believed that in 3D structures the volume of structure openings with apparent diameters greater than about 5 microns should be at least about 15% of the volume of the structure, in order to improve acoustic performance at 100 Hz. On the other hand, the volume of structure openings with apparent diameters greater than 0.01 um is about 60% of the structure volume in structure 3, while it is about 50% in structure 2. Structure 3 provides an apparent volume ratio of 1.5 at 100 Hz, while Structure 2 provides an apparent volume ratio of 1.16. Accordingly, it is believed that in 3D structures the volume of structure openings with apparent diameters greater than about 0.01 microns should be at least about 40% of the volume of the structure, in order to improve acoustic performance at 100 Hz. These three structures have a bulk density of about 0.7 g/cc, and so the cumulative volume of structure openings with apparent diameters greater than about 5 microns can be calculated to be greater than about 0.2 ml/g and the cumulative volume of structure openings with apparent diameters greater than about 0.01 microns can be calculated to be greater than about 0.6 ml/g.

A number of implementations have been described. Nevertheless, it will be understood that additional modifications may be made without departing from the scope of the inventive concepts described herein, and, accordingly, other embodiments are within the scope of the following claims.

What is claimed is:

1. A three-dimensional air-adsorbing structure that has a volume, comprising:
   (i) a three-dimensional, unitary, skeletal, porous scaffold having scaffold openings distributed within the volume of the scaffold, where the scaffold openings make up at least about 50% of the volume of the scaffold;
   (ii) air-adsorbing material particles; and
   (iii) one or more hydrophobic binders that couple air-adsorbing material particles to each other to form agglomerates and couples particles and agglomerates to the scaffold;
   wherein the structure has structure openings in the agglomerates and structure openings between agglomerates, such structure openings being open to the outside environment, wherein the cumulative volume of the structure openings that have an apparent diameter larger than about 0.01 microns as measured by mercury porosimetry is at least 40% of the volume of the air-adsorbing structure, and the cumulative volume of the structure openings that have an apparent diameter larger than about 5 microns as measured by mercury porosimetry is at least 15% of the volume of the air-adsorbing structure.

2. The three-dimensional air-adsorbing structure of claim 1 wherein the cumulative volume of the structure openings that have an apparent diameter larger than about 5 microns as measured by mercury porosimetry is greater than 0.2 ml/g of the air-adsorbing structure.

3. The three-dimensional air-adsorbing structure of claim 1 wherein the cumulative volume of the structure openings that have an apparent diameter larger than about 0.01 microns as measured by mercury porosimetry is greater than 0.6 ml/g of the air-adsorbing structure.

4. The three-dimensional air-adsorbing structure of claim 1 wherein the structure further comprises closed volumes that are not open to the outside environment, and wherein the volume of the structure openings is greater than the volume of the closed volumes.

5. The three-dimensional air-adsorbing structure of claim 4 wherein the volume of the structure openings is at least nine times the volume of the closed volumes.

6. The three-dimensional air-adsorbing structure of claim 1 wherein the scaffold comprises an open-cell foam or an electrospun fibrous material.

7. The three-dimensional air-adsorbing structure of claim 6 wherein the open-cell foam has at least about 10 cells per inch.

8. The three-dimensional air-adsorbing structure of claim 7 wherein the open-cell foam has more than about 50 cells per inch and less than about 500 cells per inch.

9. The three-dimensional air-adsorbing structure of claim 1 wherein the scaffold openings make up at least about 90% of the volume of the scaffold.

10. The three-dimensional air-adsorbing structure of claim 1 wherein the scaffold comprises melamine foam or polyurethane foam.

11. The three-dimensional air-adsorbing structure of claim 1 wherein the air-adsorbing material and the agglomerates are coupled to the scaffold by creating a water-based emulsion of air-adsorbing material, agglomerates of the material, and binder, and then impregnating the scaffold with this emulsion.

12. The three-dimensional air-adsorbing structure of claim 11 wherein the binder comprises an acrylic material or a polyurethane material or a polyacrylate material.

13. The three-dimensional air-adsorbing structure of claim 11 wherein the emulsion is dried at least in part at a temperature below the freezing point of the emulsion.

14. The three-dimensional air-adsorbing structure of claim 1 wherein the openings in the structure further comprise a plurality of channels in the structure that are open to the environment and have diameters of greater than the apparent diameter of the structure openings between agglomerates.

15. The three-dimensional air-adsorbing structure of claim 1 wherein the binder is sufficiently hydrophobic that the surface tension of a film cast with the binder, measured with deionized water as the test solution, is less than about 55 dynes/cm.

16. The three-dimensional air-adsorbing structure of claim 15 wherein the binder is sufficiently hydrophobic that the surface tension of a film cast with the binder, measured with deionized water as the test solution, is less than 45 dynes/cm.

17. The three-dimensional air-adsorbing structure of claim 1 wherein the air-adsorbing material comprises a silicon-based zeolite material.

18. The three-dimensional air-adsorbing structure of claim 1 wherein the air-adsorbing material comprises powdered activated carbon.

19. The three-dimensional air-adsorbing structure of claim 1 wherein the structure further comprises closed volumes that are not open to the outside environment, and wherein the surface area of the structure openings plus the surface area of closed volumes, as measured by CT scanning with a resolution of at least 5 microns, is at least about 3 $mm^2/mm^3$ of air-adsorbing structure.

20. The three-dimensional air-adsorbing structure of claim 1 where the acidity of the air-adsorbing structure, as determined by mixing one part of the structure with five parts of water and measuring the resulting pH, is such that the pH is greater than 4.

21. A three-dimensional air-adsorbing structure that has a volume, comprising:
(i) a three-dimensional, unitary, skeletal, porous scaffold having scaffold openings distributed within the volume of the scaffold, where the scaffold openings make up at least about 90% of the volume of the scaffold;
(ii) air-adsorbing material particles; and
(iii) a hydrophobic binder that couples air-adsorbing material particles to each other to form agglomerates and couples particles and agglomerates to the scaffold;
wherein the structure has structure openings in the agglomerates and structure openings between agglomerates, such structure openings being open to the outside environment, wherein the cumulative volume of the structure openings that have an apparent diameter larger than about 0.01 microns as measured by mercury porosimetry is at least 40% of the volume of the air-adsorbing structure and wherein the cumulative volume of the structure openings that have an apparent diameter larger than about 5 microns as measured by mercury porosimetry is at least about 15% of the volume of the air-adsorbing structure; and
wherein the structure further comprises closed volumes that are not open to the outside environment, and wherein the volume of the structure openings is at least nine times the volume of the closed volumes.

22. The three-dimensional air-adsorbing structure of claim 21 wherein:
the scaffold comprises melamine foam or polyurethane foam;
the binder is selected from the group of binders consisting of an acrylic material, a polyurethane material and a polyacrylate material, and wherein the binder is sufficiently hydrophobic that the surface tension of a film cast with the binder, measured with deionized water as the test solution, is less than about 55 dynes/cm; and
the air-adsorbing material and the agglomerates are coupled to the scaffold by creating an emulsion of air-adsorbing material, agglomerates of the material and binder and then impregnating the scaffold with this emulsion, wherein the emulsion is dried at least in part at a temperature below the freezing point of the emulsion.

* * * * *